(12) United States Patent
Kachmar (10) Patent No.: US 7,929,819 B2
(45) Date of Patent: Apr. 19, 2011

(54) FIELD TERMINATION KIT

(75) Inventor: Wayne M. Kachmar, North Bennington, VT (US)

(73) Assignee: ADC Telecommunications, Inc., Eden Prairie, MN (US)

( * ) Notice: Subject to any disclaimer, the term of this patent is extended or adjusted under 35 U.S.C. 154(b) by 0 days.

(21) Appl. No.: 12/720,361

(22) Filed: Mar. 9, 2010

(65) Prior Publication Data

US 2010/0272401 A1    Oct. 28, 2010

Related U.S. Application Data

(63) Continuation of application No. 12/101,366, filed on Apr. 11, 2008, now Pat. No. 7,676,134.

(60) Provisional application No. 60/911,792, filed on Apr. 13, 2007.

(51) Int. Cl.
*G02B 6/00* (2006.01)

(52) U.S. Cl. ............... 385/137; 385/76; 385/85; 385/95; 385/97; 385/98; 385/134; 385/135; 385/136

(58) Field of Classification Search ............... 385/76, 385/85, 95, 97–98, 134–137
See application file for complete search history.

(56) References Cited

U.S. PATENT DOCUMENTS

| | | |
|---|---|---|
| 3,975,865 A | 8/1976 | Lewis |
| 4,178,722 A | 12/1979 | Forman et al. |
| 4,255,164 A | 3/1981 | Butzke et al. |
| 4,272,926 A | 6/1981 | Tamulevich |
| 4,588,256 A | 5/1986 | Onstott et al. |
| 4,657,341 A * | 4/1987 | Sammueller .............. 385/59 |
| 4,669,820 A | 6/1987 | Ten Berge |
| 4,746,194 A | 5/1988 | Rasmussen |
| 4,787,699 A | 11/1988 | Moulin |
| 4,850,671 A | 7/1989 | Finzel |
| 4,984,865 A | 1/1991 | Lee et al. |
| RE34,005 E | 7/1992 | Levinson et al. |
| 5,151,961 A | 9/1992 | Hvezda et al. |
| 5,193,133 A | 3/1993 | Schofield et al. |

(Continued)

FOREIGN PATENT DOCUMENTS

EP    0 479 415 A2    4/1992

(Continued)

OTHER PUBLICATIONS

File History of U.S. Appl. No. 11/693,908 as of Sep. 15, 2009.

(Continued)

*Primary Examiner* — Brian M. Healy
*Assistant Examiner* — Guy G Anderson
(74) *Attorney, Agent, or Firm* — Merchant & Gould P.C.

(57) ABSTRACT

A field termination kit includes an optical fiber preparation device for preparing an end of an optical fiber, an optical inspection device for inspecting the end of the optical fiber, and a termination assembly for terminating the end of the optical fiber. A method of using a field termination kit includes rotating an end of a first optical fiber about a center of an abrasive portion of an optical fiber preparation tool. The end is pressed against an adhesive portion of the optical fiber preparation tool to clean contaminants from the end. The end is inserted into an inner passage of an optical fiber inspection device for viewing. The end is inserted into a termination assembly. The end is terminated to an end of a second optical fiber in a termination region of the termination assembly.

20 Claims, 6 Drawing Sheets

U.S. PATENT DOCUMENTS

| | | | |
|---|---|---|---|
| 5,325,452 A | 6/1994 | Stein et al. |
| 5,418,876 A | 5/1995 | Lee |
| 5,446,819 A | 8/1995 | Foster et al. |
| 5,469,521 A | 11/1995 | Coutts et al. |
| 5,577,149 A | 11/1996 | Averbeck et al. |
| 5,611,017 A | 3/1997 | Lee et al. |
| 5,626,639 A | 5/1997 | King |
| 5,631,986 A | 5/1997 | Frey et al. |
| 5,647,043 A | 7/1997 | Anderson et al. |
| 5,731,893 A | 3/1998 | Dominique |
| 5,778,125 A | 7/1998 | Busse et al. |
| 5,806,175 A | 9/1998 | Underwood |
| 5,813,902 A | 9/1998 | Wiegand |
| 5,883,995 A | 3/1999 | Lu |
| 5,956,793 A | 9/1999 | Cox |
| 6,054,007 A | 4/2000 | Boyd et al. |
| 6,078,719 A | 6/2000 | Wiegand et al. |
| 6,079,880 A | 6/2000 | Blom |
| 6,099,392 A | 8/2000 | Wiegand et al. |
| 6,142,676 A | 11/2000 | Lu |
| 6,179,658 B1 | 1/2001 | Gunay et al. |
| 6,325,670 B2 | 12/2001 | Murayama |
| 6,341,898 B1 | 1/2002 | Matsushita |
| 6,432,511 B1 | 8/2002 | Davis et al. |
| 6,466,310 B2 | 10/2002 | Nguyen et al. |
| 6,513,989 B1 | 2/2003 | Bleck et al. |
| 6,560,811 B1 | 5/2003 | Krause et al. |
| 6,597,835 B2 | 7/2003 | Jie et al. |
| 6,672,772 B2 | 1/2004 | Gimbel et al. |
| 6,685,129 B2 | 2/2004 | Nguyen et al. |
| 6,733,184 B2 | 5/2004 | Nguyen et al. |
| 6,758,727 B2 | 7/2004 | Coad |
| 6,765,658 B2 | 7/2004 | Nguyen et al. |
| 6,782,182 B2 | 8/2004 | Dautartas et al. |
| 6,790,131 B2 | 9/2004 | Wetenkamp et al. |
| 6,810,552 B2 | 11/2004 | Miyake et al. |
| 6,811,321 B1 | 11/2004 | Schmalzigaug et al. |
| 6,811,323 B2 * | 11/2004 | Murray et al. ............... 385/80 |
| 6,819,858 B2 | 11/2004 | Steinberg et al. |
| 6,848,837 B2 | 2/2005 | Gilligan |
| 6,893,591 B2 | 5/2005 | Davis et al. |
| 6,945,706 B2 | 9/2005 | Gimbel et al. |
| 6,978,071 B2 | 12/2005 | Hwang et al. |
| 7,112,119 B1 | 9/2006 | Swedek et al. |
| 7,140,950 B1 | 11/2006 | Bylander et al. |
| 7,147,384 B2 | 12/2006 | Hardcastle et al. |
| 7,192,197 B2 | 3/2007 | Carberry et al. |
| 7,217,172 B2 | 5/2007 | Medeiros |
| 7,676,134 B2 | 3/2010 | Kachmar |
| 2001/0033730 A1 | 10/2001 | Fentress |
| 2002/0067894 A1 | 6/2002 | Scanzillo |
| 2002/0154868 A1 | 10/2002 | Kraus et al. |
| 2003/0063868 A1 | 4/2003 | Fentress |
| 2003/0128939 A1 | 7/2003 | Nguyen et al. |
| 2003/0133671 A1 | 7/2003 | Murray et al. |
| 2003/0156799 A1 | 8/2003 | Wada et al. |
| 2004/0020514 A1 | 2/2004 | Orsillo |
| 2004/0057672 A1 | 3/2004 | Doss et al. |
| 2005/0135755 A1 | 6/2005 | Kiani et al. |
| 2005/0213899 A1 | 9/2005 | Hurley et al. |
| 2005/0265669 A1 | 12/2005 | Heminway et al. |
| 2005/0276559 A1 | 12/2005 | Bianchi |
| 2005/0281509 A1 | 12/2005 | Cox et al. |
| 2005/0281518 A1 | 12/2005 | Tanaka et al. |
| 2006/0188208 A1 | 8/2006 | Carberry |

FOREIGN PATENT DOCUMENTS

| | | |
|---|---|---|
| EP | 0 689 070 A1 | 12/1995 |
| EP | 0 810 455 A1 | 12/1997 |
| EP | 0 916 974 A2 | 5/1999 |
| EP | 1 184 695 A1 | 3/2002 |
| GB | 2 193 342 | 2/1988 |
| JP | 59/177513 | 10/1984 |
| JP | 61-284710 | 12/1986 |
| JP | 4-40402 | 2/1992 |
| WO | WO 97/23797 | 7/1997 |
| WO | WO 01/96923 A1 | 12/2001 |

OTHER PUBLICATIONS

File History of U.S. Appl. No. 11/693,908.

File History of U.S. Appl. No. 11/694,614.

File History of U.S. Appl. No. 11/735,267.

* cited by examiner

FIELD TERMINATION KIT

CROSS-REFERENCE TO RELATED APPLICATIONS

This application is a continuation of U.S. patent application Ser. No. 12/101,366, filed Apr. 11, 2008, which claims the benefit of U.S. Provisional Patent Application Ser. No. 60/911,792, filed Apr. 13, 2007, which applications are hereby incorporated by reference in their entireties.

TECHNICAL FIELD

The present disclosure relates to fiber optic terminations, and more particularly, to a field termination kit.

BACKGROUND

The use of fiber optic networks as a signal-carrying medium for communications is now extremely widespread and continues to increase. Fiber optic networks frequently include a plurality of fiber optic cables having optical fibers. As fiber optic networks continue to grow, the need for optical fiber terminations for maintenance or expansion purposes is also growing. As such, there is a need for a fiber termination kit which can be used in the field in order to terminate an optical fiber or optical fibers.

SUMMARY

An aspect of the present disclosure relates to a field termination kit including an optical fiber preparation device for preparing an end of an optical fiber, an optical inspection device for inspecting the end of the optical fiber, and a termination assembly for terminating the end of the optical fiber.

Another aspect of the present disclosure relates to a field termination kit including an optical fiber preparation device for preparing an end of an optical fiber, an optical inspection device for inspecting the end of the optical fiber, and a termination assembly for terminating the end of the optical fiber. The optical fiber preparation device has an adhesive portion and an abrasive portion. The termination assembly includes a connector and a carrier. The connector includes a main body with a ferrule assembly disposed in the main body. The ferrule assembly is adapted for axial movement within the main body. The carrier includes a connector end adapted for engagement with the connector, an oppositely disposed cable end, a termination region disposed between the connector end and the cable end, and a take-up region disposed between the connector end and the termination region.

Another aspect of the present disclosure relates to a method of using a field termination kit. The method includes rotating an end of a first optical fiber about a center of an abrasive portion of an optical fiber preparation tool. The end is pressed against an adhesive portion of the optical fiber preparation tool to clean contaminants from the end. The end is inserted into an inner passage of an optical fiber inspection device for viewing. The end is inserted into a termination assembly. The end is terminated to an end of a second optical fiber in a termination region of the termination assembly.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

DETAILED DESCRIPTION

Reference will now be made in detail to the exemplary aspects of the present disclosure that are illustrated in the accompanying drawings. Wherever possible, the same reference numbers will be used throughout the drawings to refer to the same or like structure.

Figure 1:
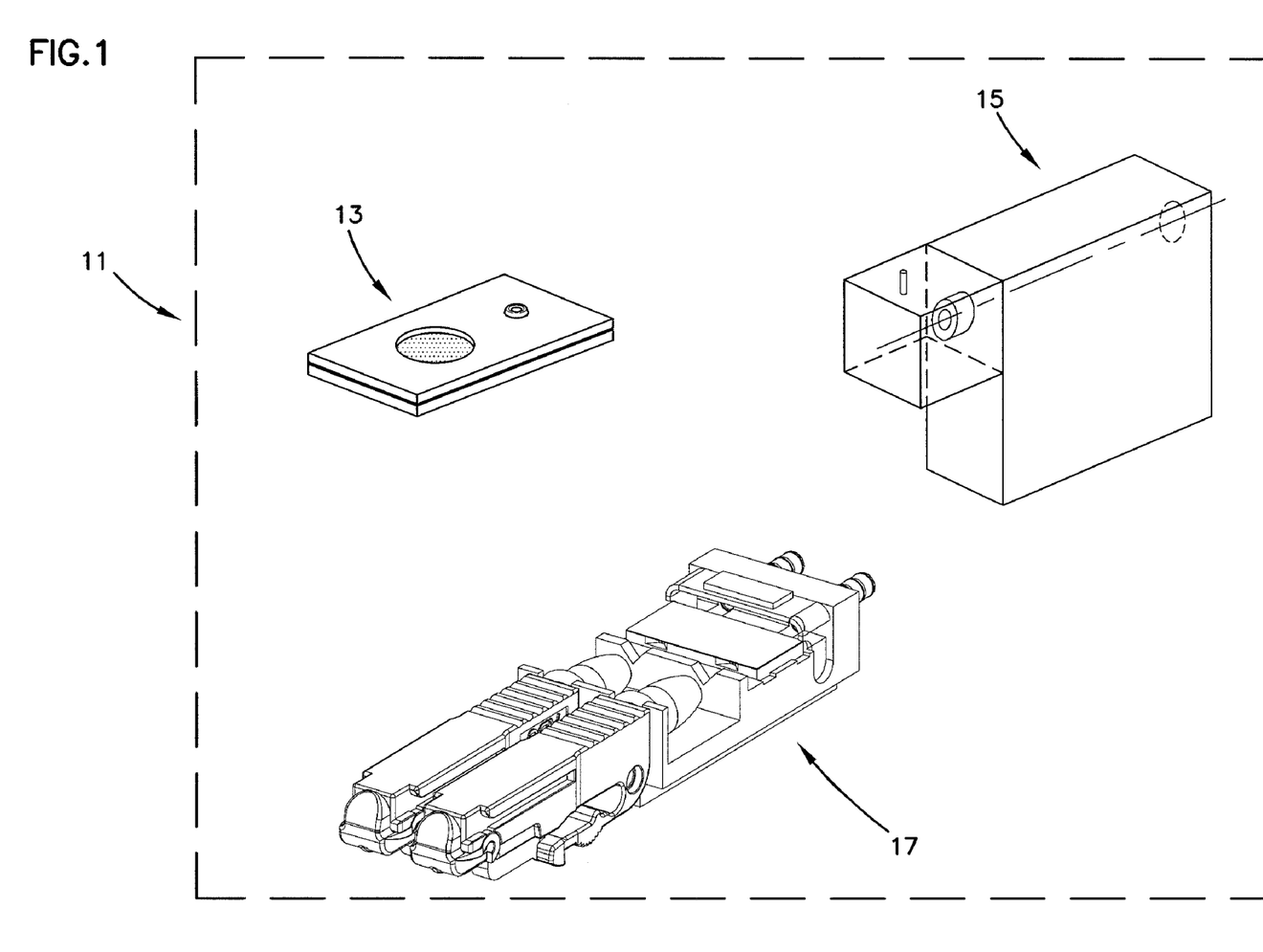
FIG. 1 is a perspective view of a field termination kit having features that are examples of aspects in accordance with the principles of the present disclosure.

Referring now to FIG. 1, a field optical fiber termination kit 11 is shown. The field optical fiber termination kit 11 includes an optical fiber preparation device, generally designated 13, an optical fiber inspection device, generally designated 15, and a fiber optic connector assembly, generally designated 17. In the subject embodiment, the field optical fiber termination kit 11 is packaged in a structure, such as a box, a bag, shrink wrap, etc.

Figure 2:
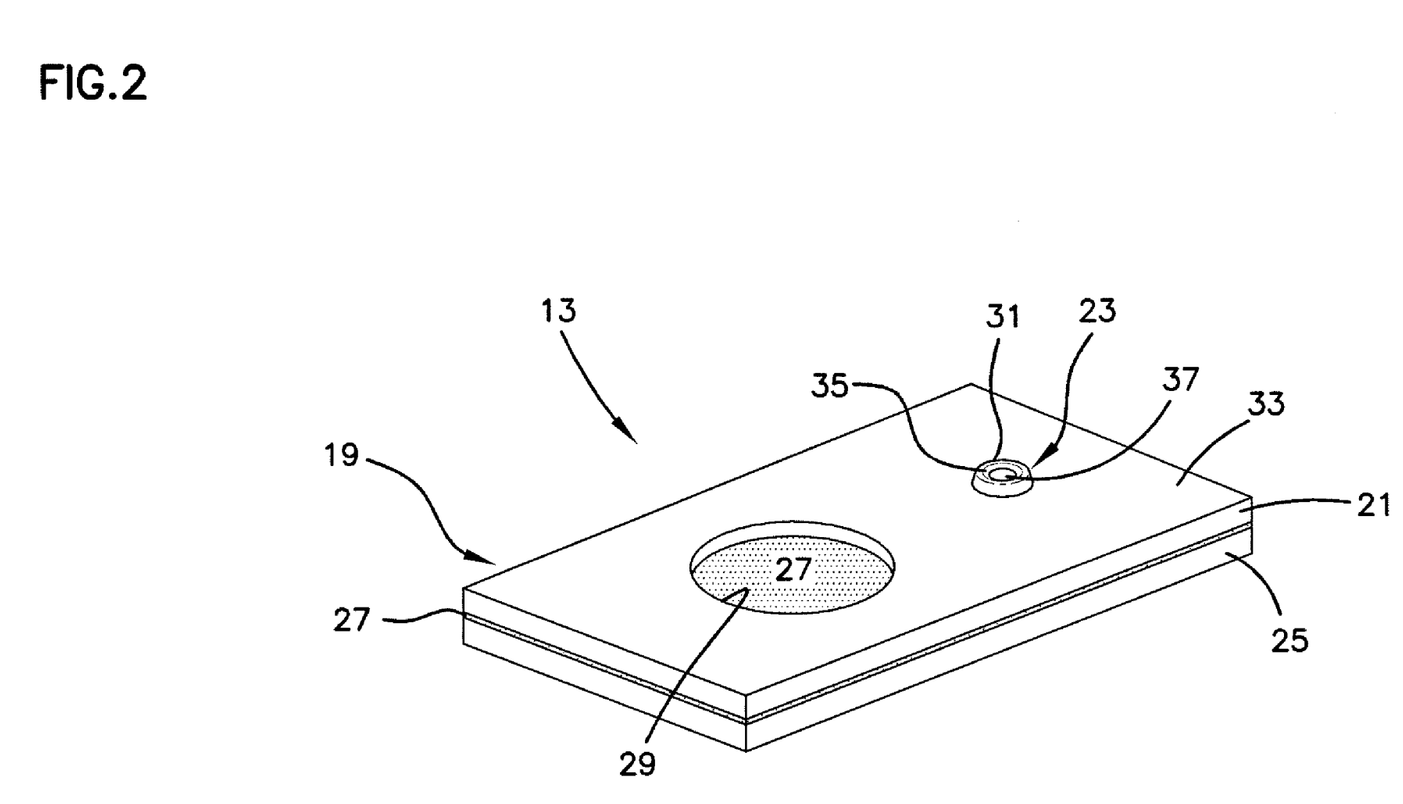
FIG. 2 is a perspective view of an optical fiber preparation device of FIG. 1.

Referring now to FIG. 2, the optical fiber preparation device 13 will be described. The optical fiber preparation device 13 has been described in detail in U.S. patent application Ser. No. 11/693,908, entitled "Optical Fiber Preparation Device", filed on Mar. 30, 2007 and is hereby incorporated by reference in its entirety. The optical fiber preparation device 13 includes a body 19 having a first substrate 21 with at least one abrasive portion 23 and a second substrate 25 with at least one adhesive portion 27. In the subject embodiment, the first substrate 21, which is mounted onto the second substrate 25, includes at least one thru hole 29 that exposes the adhesive portion 27 of the second substrate 25.

The abrasive portion 23 includes an annular protrusion 31 that projects away from a planar top surface 33 of the body 19. The annular protrusion 31 has a polishing portion 35. The polishing portion 35 has a tapered shape (e.g. conical) with an inner diameter that narrows as it extends downwardly. In a preferred embodiment, the annular protrusion 31 and the polishing portion 35 are sized so that only the outer diameter of an optical fiber is contacted. In other words, in a preferred embodiment, the core of the optical fiber is not contacted by the polishing portion 35. The annular protrusion 31 defines an orifice 37 that allows particles generated during polishing to pass through the body 19. In a preferred embodiment, the orifice 37 is located at or about the center of the polishing portion 35. In the subject embodiment, the adhesive portion 27 is a medium tack adhesive that is accessible through a hole 39 in the body 19.

Figure 3:
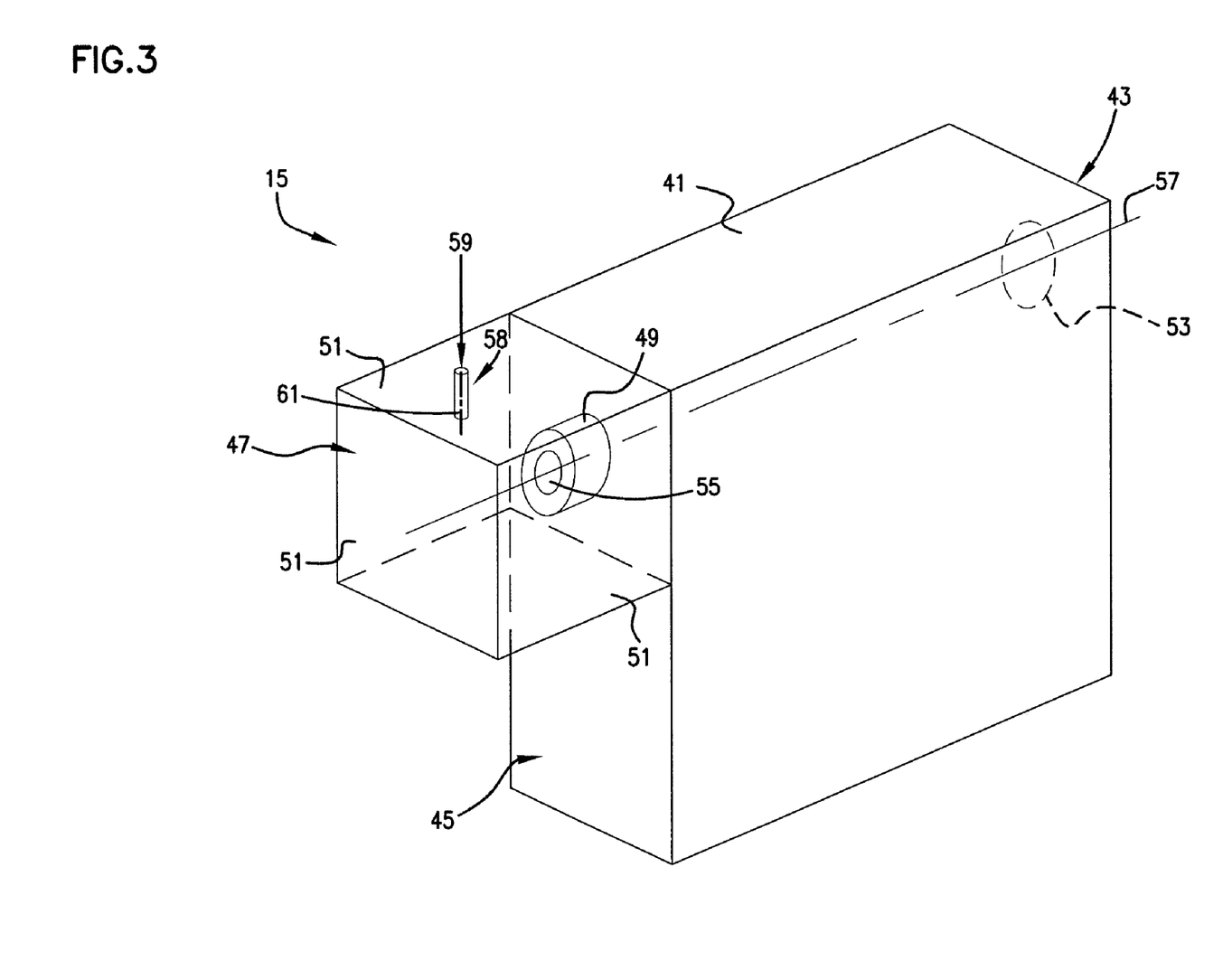
FIG. 3 is a perspective view of an optical fiber inspection device of FIG. 1.

Referring now to FIG. 3, the optical fiber inspection device 15 will be described. The optical fiber inspection device 15 has been described in detail in U.S. patent application Ser. No. 11/694,614, entitled "Optical Fiber Inspection Tool", filed on Mar. 30, 2007 and is hereby incorporated by reference in its entirety. The optical fiber inspection device 15 includes a housing 41 having a first end portion 43, a second end portion 45, and a viewing portion 47. A lens 49 is disposed in the housing 41.

In the subject embodiment, the viewing portion 47 protrudes from the second end portion 45 of the housing 41. It will be understood, however, that the scope of the present disclosure is not limited to the viewing portion 47 protruding from the second end portion 45 of the housing 41. In a preferred embodiment, the viewing portion 47 includes at least one exterior surface 51 that is made of a material that is either transparent or translucent. This transparent or translucent material allows for the entry of light from an external light source, either natural or artificial, into the viewing portion 47. To allow greater entry of light into the viewing portion 47 of the subject embodiment, five exterior surfaces 51 of the viewing portion 47 are manufactured from this transparent or translucent material.

The housing 41 defines an opening 53 (shown as a hidden line in FIG. 3 with a dashed lead line to the reference numeral) in the first end portion 43, through which the lens 51 can be viewed. The lens 51 provides a magnification of objects within a field of view 55 of the lens 51. In a preferred embodiment, the lens 51 has a magnification power in the range of 60× to 400×, although it will be understood that the scope of the present disclosure is not limited to such magnification powers of the lens 51. The center of the lens 51 and the center of an opening 53 in the first end portion 43 cooperatively define an axis of viewing 57.

A fiber position assembly 58 defines an inner passage 59 that is used to present an end of an optical fiber into the field of view 55 of the lens 51 for inspection purposes. The inner passage 59 is disposed in the housing 41 such that a longitudinal axis 61 of the inner passage 59 is about perpendicular to the axis of viewing 57. This orientation of the inner passage 59 with respect to the axis of viewing 57 is advantageous as it allows the user of the optical fiber inspection device 15 to not only determine the condition of an end surface of the optical fiber but also to assess whether the cleaved end of the optical fiber is of proper axial length for insertion into a splice.

Figure 4:
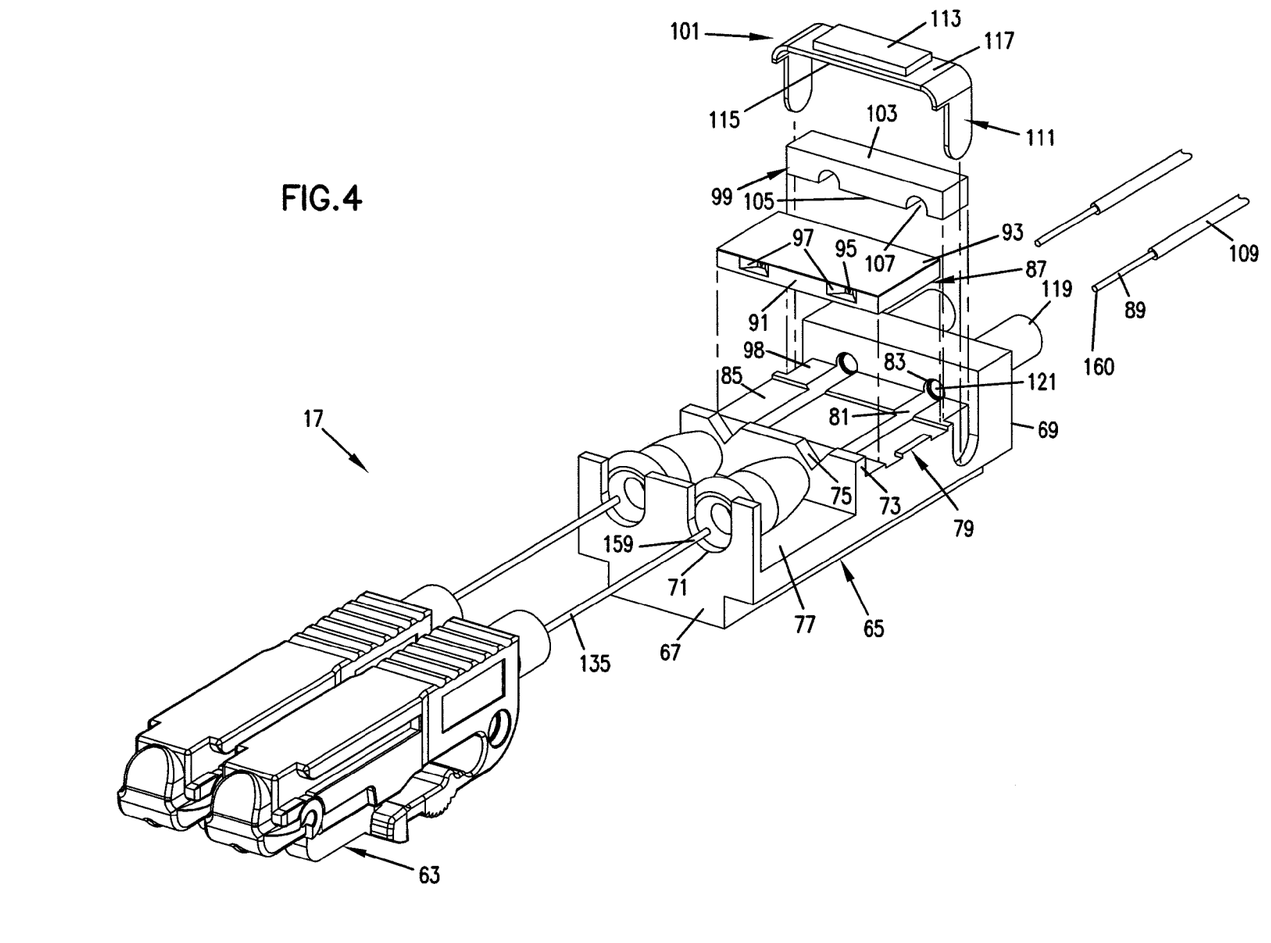
FIG. 4 is a perspective view of a fiber optic connector assembly of FIG. 1.

Referring now to FIG. 4, a fiber optic connector assembly 17 is shown. The fiber optic connector assembly 17 has been described in U.S. patent application Ser. No. 11/735,267, entitled "Field Terminatable Fiber Optic Connector Assembly," filed on Apr. 13, 2007 and is hereby incorporated by reference in its entirety. The fiber optic connector assembly 17 includes a connector 63 and a carrier 65.

In the subject embodiment, the connector 63 is an LX.5-type connector, which has been described in U.S. Pat. Nos. 5,883,995 and 6,142,676 that are hereby incorporated by reference in their entirety. It will be understood, however, that the scope of the present disclosure is not limited to the connector 63 being an LX.5-type connector.

The carrier 65 includes a connector end 67 and a cable end 69, which is oppositely disposed from the connector end 67. In the subject embodiment, the connector end 67 defines a slot 71 for mounting the connector 63. It will be understood, however, that the scope of the present disclosure is not limited to the carrier 65 defining the slot 71 for mounting the connector 63. Disposed between the connector end 67 and the cable end 69 of the carrier 65 is a fiber support region 73. In the subject embodiment, the fiber support region 73 includes guide ways 75 that narrow as the depth of the guide ways 75 in the fiber support region 73 increase. The carrier 65 further defines a take-up region 77, the purpose of which will be described subsequently, that is disposed between the connector end 67 and the fiber support region 73.

A termination region, generally designated 79, is disposed between the cable end 69 of the carrier 65 and the fiber support region 73. The termination region 79 of the carrier 65 defines guide paths 81 that are generally aligned with the guide ways 75 and crimp tube holes 83 defined by the cable end 69. In the subject embodiment, the guide paths 81 narrow as the depth of the guide paths 81 in the termination region 79 increase. The termination region 79 further defines a cavity 85. The cavity 85 is adapted to receive a V-groove chip, generally designated 87.

The V-groove chip 87 in the fiber optic connector assembly 17 serves as the location for the termination of a cleaved optical fiber 89. The V-groove chip 87 includes a base 91 and a cover 93. The base 91 defines V-grooves 95 that support the cleaved optical fiber 89. Tapered openings 97 are disposed on either side of the V-grooves 95 in order to assist in the insertion of the cleaved optical fibers 89 into the V-grooves 95. In the subject embodiment, the base 91 is made of a silicon material while the cover 93 is made of a transparent material such as pyrex. The cover 93 is bonded to the base 91.

The termination region 79 in the carrier 65 includes an adhesive region 98 disposed between the cavity 85 and the cable end 69. Disposed in the adhesive region 98 is a heat responsive adhesive element, generally designated 99, and a saddle assembly, generally designated 101. In the subject embodiment, the heat responsive adhesive element 99 is a glue pellet. The glue pellet 99 is shown as being generally rectangular in shape, although it will be understood that the scope of the present disclosure is not limited to the glue pellet 99 being rectangular in shape. The glue pellet 99 includes a first surface 103 and an oppositely disposed second surface 105. At least one pathway 107 is pre-formed in the glue pellet 99. In the subject embodiment, the at least one pathway 107 is a channel that is pre-formed in the second surface 105 of the glue pellet 99. In the preferred embodiment, two channels 107 are pre-formed in the second surface 105. The channels 107 are adapted to receive a portion of the cleaved optical fibers 89 and a portion of buffers 109, which surround the cleaved optical fibers 89. In the subject embodiment, each of the channels 107 is arcuately shaped so as to conform to the outer surface of the buffers 109.

In the subject embodiment, the saddle assembly 101 includes a saddle, generally designated 111, and a resistor 113. The glue pellet 99 is in thermally conductive contact with the saddle 111, which is in thermally conductive contact with the resistor 113. In the subject embodiment, the first surface 103 of the glue pellet 99 is in contact with a bottom surface 115 of the saddle 111, thereby establishing the thermally conductive contact between the glue pellet 99 and the saddle 111. The resistor 113 is in contact with a top surface 117 of the saddle 111, thereby establishing the thermally conductive contact between the resistor 113 and the saddle 111. A portion of the outer surface of each buffer 109 is disposed in channels 107 of the glue pellet 99. In the subject embodiment, nearly half of the outer circumference of the outer surface of the buffers 109 is disposed in the channels 107.

The carrier 65 further includes crimp tubes 119, which are engaged with the cable end 69 of the carrier 65. In the subject embodiment, the crimp tubes 119 are in a press-fit engagement with the crimp tube holes 83 in the cable end 69 of the carrier 65. The crimp tubes 119 define passageways 121 through which the cleaved optical fibers 89 are inserted.

Strength members/layers (e.g., Kevlar) of a fiber optic cable can be crimped outside the crimp tube 119 for securing the fiber optic cable.

Figure 5:
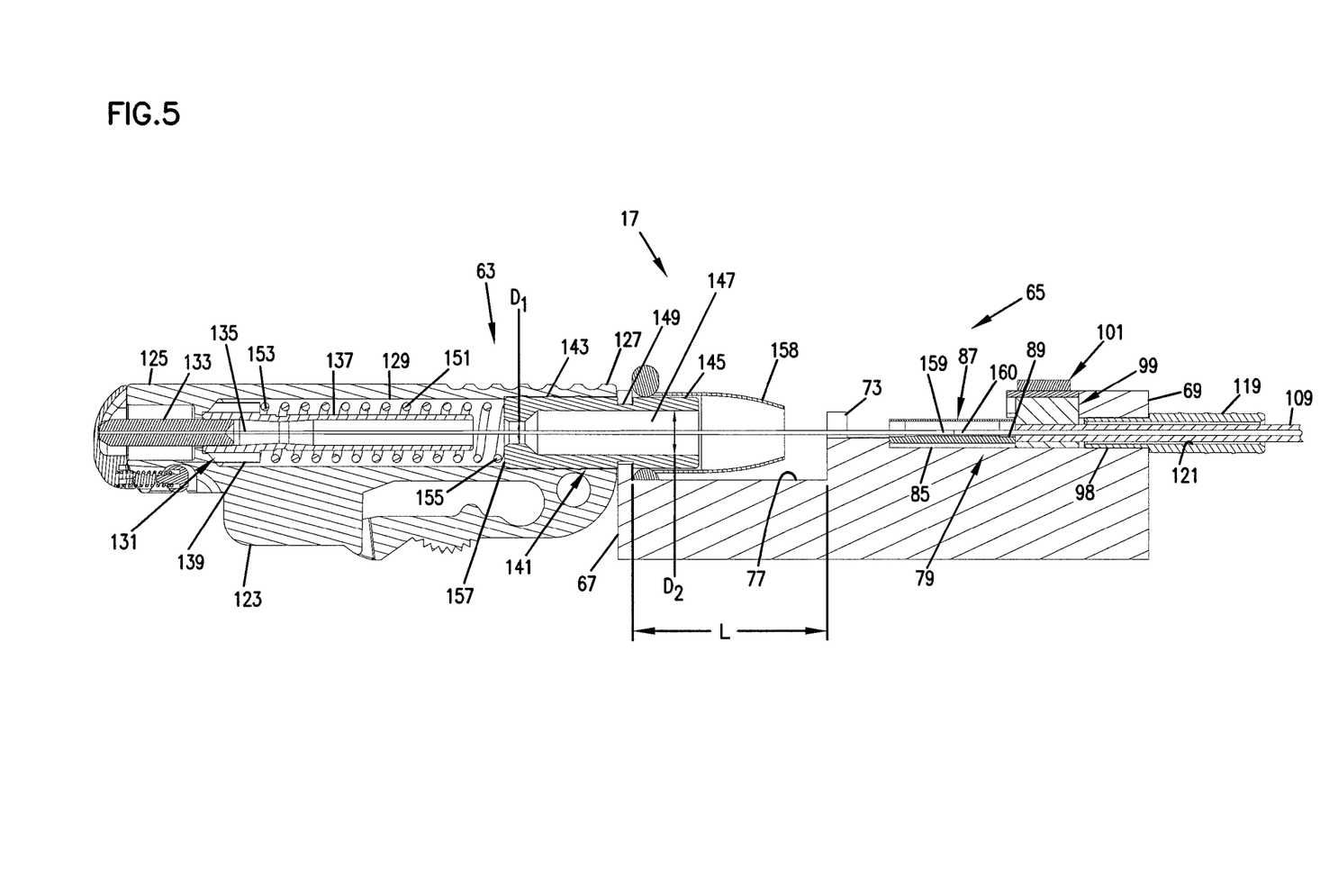
FIG. 5 is a cross-sectional view of the fiber optic connector assembly taken on line 5-5 of FIG. 1.

Referring now to FIG. 5, the connector 63 will be described. The connector 63 includes a main body 123 having a front end region 125 and an oppositely disposed back end region 127. The main body 123 defines a longitudinal bore 129 that extends through the front and back end regions 125, 127. A ferrule assembly, generally designated 131, includes a ferrule 133, an optical fiber 135, a portion of which is housed in the ferrule 133, and a hub 137 having a flange 139 connectedly engaged with the ferrule 133. The ferrule assembly 131 is disposed in the longitudinal bore 129 of the connector 63 such that the ferrule 133 is positioned in the front end region 125 of the main body 123.

The connector 63 further includes a tube, generally designated 141. The tube 141 has a first end portion 143 and an oppositely disposed second end portion 145 and defines a passage 147 through the tube 141. The first end portion 143 of the tube 141 is connectedly engaged with the longitudinal bore 129 at the back end portion 127 of the main body 123. In the subject embodiment, the connected engagement between the tube 141 and the main body 123 is a press-fit engagement. In the subject embodiment, an inner diameter $D_1$ of the passage 147 at the first end portion 143 of the tube 141 is smaller than an inner diameter $D_2$ of the passage 147 at the second end portion 145. The purpose for the difference in the inner diameters $D_1$, $D_2$ of the passage 147 between the first and second end portions 143, 145, respectively, will be described subsequently. The tube 141 further includes an annular groove 149 disposed in the outer surface of the tube 141 between the first end portion 143 and the second end portion 145.

Disposed between the ferrule assembly 131 and the tube 141 is a spring 151. A first end 153 of the spring 151 abuts the flange 139 of the hub 137 while an oppositely disposed second end 155 of the spring 151 abuts an end surface 157 of the first end portion 143 of the tube 141. While the spring 151 biases the ferrule assembly 131 toward the front end region 125 of the main body 123, the spring 151 allows for axial movement of the ferrule assembly 131 within the longitudinal bore 129. In the subject embodiment, and by way of example only, the spring 151 allows for at least 1 mm of axial movement of the ferrule assembly 131.

With the ferrule assembly 131, tube 141, and spring 151 disposed in the main body 123, the connector 63 can be connected to the carrier 65. To connect the connector 63 to the carrier 65, the connector 63 is inserted into the slot 71 of the carrier 65 such that the slot 71 is disposed in the annular groove 149 of the tube 151. In the subject embodiment, the annular groove 149 is in a press-fit engagement with the slot 71. With the connector 63 engaged with the carrier 65, dust boots 158 are inserted over fiber ends 159 of the optical fibers 135, which extend through the longitudinal bore 129 of the main body 123 and the passage 147 of the tube 151. The dust boots 158 are in tight-fit engagement with the second end portion 155 of the tube 151 and are disposed in the take-up region 77 of the carrier 65. The fiber ends 159 of the optical fibers 135 are then inserted through the tapered openings 97 of the V-groove chip 87 and into the V-grooves 95. With the fiber ends 159 of the optical fibers 135 inserted into the V-grooves 95 of the V-groove chip 87, the optical fibers 135 are secured to the guide ways 75 of the fiber support region 73. In the subject embodiment, the optical fibers 135 are affixed to the guide ways 75 with an epoxy. The affixation of the optical fibers 135 in the guide ways 75 prevents the fiber ends 159 of the optical fibers 135 from moving axially within the V-grooves 95 of the V-groove chip 87.

As stated previously, the spring 151 allows the ferrule assembly 131 to move axially within the longitudinal bore 129 of the main body 123 toward the carrier 65. With the optical fibers 135 affixed to the guide ways 75 of the fiber support region 73, the axial movement of the ferrule assembly 131 causes the optical fibers 131 to bend between the fiber support region 73 and the ferrule 133. However, if this bend has a radius that is smaller than the minimum recommended bend radius of the optical fibers 135, damage to the optical fibers 135 will result.

In one embodiment, the inner diameter of the passage 147 and a length L of the take-up region 77 are controlled in order to ensure that the optical fibers 135 do not have a bend radius below minimum recommendations. As the inner diameter of the passage 147 decreases, the number of bends in the optical fiber 135 increases. However, as the number of bends increase, the radii of each bend in the optical fiber 135 decreases. Therefore, there is a directly proportional relationship between the inner diameter of the passage 147 and the bend radius in the optical fiber 135.

As the length L of the take-up region 77 increases, the radii of the bends of the optical fibers 135 increases. Therefore, there is a directly proportional relationship between the length L and the bend radius of the optical fiber 135.

In the subject embodiment, the inner diameter $D_2$ of the passage 147 must be sized appropriately to account for the axial movement of the ferrule assembly 131 and the length L of the take-up region 77. If the length L of the take-up region 77 is long, the inner diameter $D_2$ of the passage 147 can be smaller since the bend radius of the optical fibers 135 will be large. On the other hand, if the length L of the take-up region 77 is short, the inner diameter $D_2$ of the passage 147 must be larger to avoid the bend radius of the optical fibers 135 being below the minimum recommendations.

As stated previously, the spring 151 abuts the end surface 157 of the first end portion 143 of the tube 141. In order to have a proper surface against which the spring 151 would act, the end surface 157 of the first end portion 143 of the tube 141 must have sufficient surface area to support the spring 151. Therefore, in order to provide a sufficient surface area to support the spring 151, the inner diameter of the passage 147 should be small. As state above, the inner diameter of the passage 147 could be reduced if the length L of the take-up region 77 was sufficiently long. This would result, however, in the fiber optic connector assembly 17 having a longer overall length, which is not desirable in some applications. Therefore, the subject embodiment resolves this dimensional conflict by having the inner diameter $D_1$ at the first end portion 143 of the tube 141 smaller than the inner diameter $D_2$ at the second end portion 145 of the tube 141. In the subject embodiment, and by way of example only, with the ferrule assembly 131 having an axial movement of at least 1 mm in the longitudinal bore 129, the inner diameter $D_1$ is about 950 µm while the inner diameter $D_2$ is about 3 mm (or about three times greater than the inner diameter $D_1$). By having the inner diameter D2 at the second end portion 145 of the tube 141 larger than the inner diameter D1 at the first end portion 143 of the tube 141, the fiber optic connector assembly 17 can be more compact.

With the connector 63 engaged to the carrier 65, the optical fiber 135 affixed in the guide way 75 of the fiber support region 73, and the fiber ends 159 inserted into the V-groove 95 of the V-groove chip 87, a cleaved end 160 of the cleaved optical fiber 89 is inserted into the passageway 121 of the crimp tube 119. The cleaved end 160 of the cleaved optical fiber 89 is inserted through the channel 107 of the glue pellet 99 and into the V-groove 95 of the V-groove chip 87. In the subject embodiment, an index matching gel is disposed between the cleaved end 160 of the cleaved optical fiber 89 and the fiber end 159 of the optical fiber 135. The index matching gel has an index of refraction that matches the index of refraction of the glass of the optical fiber 135 and the cleaved optical fiber 89.

Figure 6:
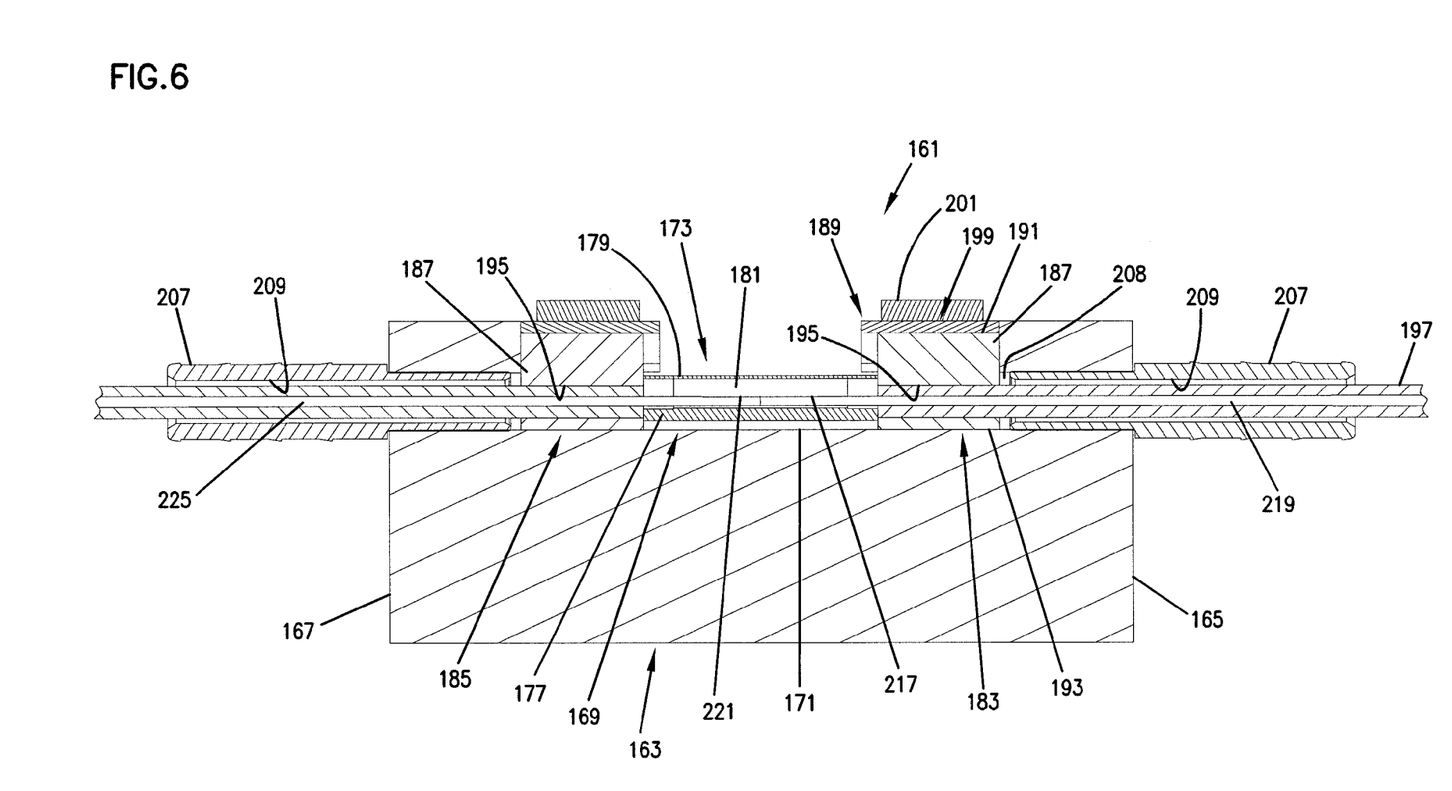
FIG. 6 is a cross-sectional view of a termination assembly having features that are examples of aspects in accordance with the principles of the present disclosure.

Referring now to FIG. 6, a termination assembly 161 is shown. The termination assembly 161 includes a carrier 163 having a first end 165 and a second end 167. A termination region 169 is disposed between the first and second ends 165, 167. The termination region 169 defines a cavity 171. The cavity 171 is adapted to receive a V-groove chip, generally designated 173. The V-groove chip 173 in the termination assembly 161 serves as the location for the termination of the optical fibers.

The V-groove chip 173 includes a base 177 and a cover 179. The base 177 defines V-grooves 181 that support the optical fibers. In the subject embodiment, the base 177 is made of a silicon material while the cover 179 is made of a transparent material such as pyrex. The cover 179 is bonded to the base 177.

The termination region 169 in the carrier 163 includes a first adhesive region 183 disposed between the cavity 171 and the first end 165 and a second adhesive region 185 disposed between the cavity 171 and the second end 167. Disposed in each of the first and second adhesive regions 183, 185 is a heat responsive adhesive element, generally designated 187, and a saddle assembly, generally designated 189. In the subject embodiment, the heat responsive adhesive element 187 is a glue pellet. The glue pellet 187 is shown as being generally rectangular in shape, although it will be understood that the scope of the present disclosure is not limited to the glue pellet 187 being rectangular in shape. The glue pellet 187 includes a first surface 191 and an oppositely disposed second surface 193. At least one pathway 195 is pre-formed in the glue pellet 187. In the subject embodiment, the at least one pathway 195 is a channel that is pre-formed in the second surface 193 of the glue pellet 187. In the preferred embodiment, two channels 195 are pre-formed in the second surface 193. The channels 195 are adapted to receive a portion of optical fibers 197. In the subject embodiment, the channels 195 are arcuately shaped so as to conform to the outer surface of the buffers of the optical fibers 197.

In the subject embodiment, the saddle assembly 189 includes a saddle, generally designated 199, and a resistor 201. The glue pellet 187 is in thermally conductive contact with the saddle 199, which is in thermally conductive contact with the resistor 201. In the subject embodiment, the first surface 191 of the glue pellet 187 is in contact with the saddle 199, thereby establishing the thermally conductive contact between the glue pellet 187 and the saddle 199. The resistor 201 is in contact with the saddle 199, thereby establishing the thermally conductive contact between the resistor 201 and the saddle 199. Portions of the outer surface of the buffers of the optical fibers 197 are disposed in the channels 195 of the glue pellet 187. In the subject embodiment, nearly half of the outer circumferences of the outer surfaces of the buffers are disposed in the channels 195.

The carrier 163 further includes crimp tubes 207, which are engaged with the first and second ends 165, 167 of the carrier 163. In the subject embodiment, the crimp tubes 207 are in a press-fit engagement with crimp tube holes 208 in the first and second ends 165, 167 of the carrier 163. The crimp tubes 207 define passageways 209 through which the optical fibers are inserted.

Referring now to FIGS. 2-6, a method for using the field optical fiber termination kit 17 will be described. A fiber optic cable requiring termination needs to be stripped and cleaved using conventional techniques. A precise stripper is usually used to remove a buffer and protective coating from the fiber optic cable. Having stripped the buffer and the protective coating from a portion of the fiber optic cable, an optical fiber is exposed. With the optical fiber exposed, the optical fiber is scribed and cleaved. After the optical fiber has been cleaved, the optical fiber preparation device 13 is used to prepare an end of the optical fiber. The end of the optical fiber is inserted into the abrasive portion 23 of the optical fiber preparation tool 13. As the end of the optical fiber enters the abrasive portion 23, the optical fiber preparation device 13 is rotated about a center of the abrasive portion 23 in a clockwise and counterclockwise direction by the user. During this rotation, the polishing portion 35 polishes the end of the optical fiber. After polishing, the end of the optical fiber is pressed against the adhesive portion 27 to clean any residual glass particles or contaminants from the end of the optical fiber. When the end of the optical fiber is removed from the adhesive portion 27, the contaminants that were attached to the end of the optical fiber become dislodged from the optical fiber and affixed to the adhesive portion 27.

With the end of the optical fiber prepared, the end is inserted into the optical fiber inspection device 15. The optical fiber is inserted through the inner passage 59 in the housing 41. The end of the optical fiber is then viewable in the field of view 55 to assess the condition of the end as well as the length of the optical fiber. If the end of the optical fiber, as viewed in the field of view 55, contains a fiber lip or contamination, the optical fiber should be removed from the optical fiber inspection device 15 and prepared using the optical fiber preparation device 13 again. If the optical fiber is too long, the optical fiber should be recleaved and prepared using the optical fiber preparation device 13 again. If the end of the optical fiber is free from fiber lips and contamination, the optical fiber is ready for termination.

An end of the optical fiber can then be inserted into the fiber optic connector assembly 17, as described above. Alternatively, an end 217 of a first optical fiber 219 and an end 221 of a second optical fiber 225 can be inserted into the termination assembly 161.

With the ends 217, 221 of the first and second optical fibers 219, 225 prepared and inspected, the ends 217, 221 are ready for insertion into the termination assembly 161. The end 217 of the first optical fiber 219 is inserted into the passageway 209 of the crimp tube 207 disposed on the first end 165 of the carrier 163, through the channel 195 of the glue pellet 187, and into the V-groove 181 of the V-groove chip 173. The end 221 of the second optical fiber 225 is inserted into the passageway 209 of the crimp tube 207 disposed on the second end 167 of the carrier 163, through the channel 195 of the glue pellet 187, and into the V-groove 183 of the V-groove chip 173. In the subject embodiment, index matching gel is disposed between the ends 217, 221 of the first and second optical fibers 219, 225. The index matching gel has an index of refraction that matches the index of refraction of the glass of the first and second optical fibers 219, 225.

With the ends 217, 221 of the first and second optical fibers 219, 225 inserted into the V-groove 181, optical radiation is passed through the first and second optical fibers 219, 225 to assess proper alignment of the ends 217, 221. If optical radiation is detectable at the junction of the ends 217, 221 as viewed through the transparent cover 179 of the V-groove chip 171, then the alignment/abutment is not correct. The ends 217, 221 may have to be polished or cleaned and reinserted into the V-groove 181. If little to no radiation is detectable at the junction of the ends 217, 221, then the first and second optical fibers 219, 225 can be secured to the termination assembly 161 by the glue pellets 187. To secure the first and second optical fibers 219, 225 to the termination assembly 161, an electrical power source is connected to each of the resistors 201. Electrical current is passed through each of the resistor 201 which heats up each of the glue pellets 187 by way of the thermally conducting saddle 199. As the glue pellets 187 heat up, the glue pellets 187 become tacky and adhere to the first and second optical fibers 219, 225 and the corresponding buffers and closes passageways 209 of the crimp tubes 207. When the current is interrupted, the glue pellets 187 resets to secure the buffers and the first and second optical fibers 219, 225 in their correct position.

With the first and second optical fibers 219, 225 secured, the termination assembly 161 can be provided as an insert for a housing to protect the termination assembly 161 from damage. One housing in which the termination assembly 161 can be inserted is described in a U.S. patent application Ser. No. 11/787,197, entitled "Hybrid fiber/copper connector system and method," filed on Apr. 13, 2007, and hereby incorporated by reference.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A termination assembly comprising:
   a carrier having:
      a first end;
      a second end oppositely disposed from the first end;
      a termination region disposed between the first and second ends, the termination region defining a cavity and including a first adhesive region disposed between the cavity and the first end and a second adhesive region disposed between the cavity and the second end;
   a V-groove chip disposed in the cavity, the V-groove chip adapted to receive first and second optical fibers for termination;
   a first heat responsive adhesive element disposed in the first adhesive region, the first heat responsive adhesive element adapted to secure the first optical fiber to the carrier; and
   a second heat responsive adhesive element disposed in the second adhesive region, the second heat responsive adhesive element being adapted to secure the second optical fiber to the carrier.

2. The termination assembly of claim 1, further comprising a first saddle assembly in thermally conductive contact with the first heat responsive adhesive element.

3. The termination assembly of claim 2, wherein the first saddle assembly includes a saddle that is in thermally conductive contact with a resistor.

4. The termination assembly of claim 3, wherein the saddle of the first saddle assembly is in contact with a surface of the first heat responsive adhesive element.

5. The termination assembly of claim 2, further comprising a second saddle assembly in thermally conductive contact with the second heat responsive adhesive element.

6. The termination assembly of claim 5, wherein the second saddle assembly includes a saddle that is in thermally conductive contact with a resistor.

7. The termination assembly of claim 6, wherein the saddle of the second saddle assembly is in contact with a surface of the second heat responsive adhesive element.

8. The termination assembly of claim 1, further comprising a first crimp tube engaged with the first end and a second crimp tube engaged with the second end, wherein the first and second crimp tubes define passageways.

9. A termination assembly comprising:
   a first optical fiber having an end;
   a second optical fiber having an end;
   a carrier having:
      a first end;
      a second end oppositely disposed from the first end;
      a termination region disposed between the first and second ends, the termination region defining a cavity and including a first adhesive region disposed between the cavity and the first end and a second adhesive region disposed between the cavity and the second end;
   a V-groove chip disposed in the cavity, wherein the V-groove chip receives the ends of the first and second optical fibers;
   a first heat responsive adhesive element disposed in the first adhesive region, the first heat responsive adhesive element securing the first optical fiber to the carrier; and
   a second heat responsive adhesive element disposed in the second adhesive region, the second heat responsive adhesive element securing the second optical fiber to the carrier.

10. The termination assembly of claim 9, further comprising a first saddle assembly in thermally conductive contact with the first heat responsive adhesive element.

11. The termination assembly of claim 10, wherein the first saddle assembly includes a saddle that is in thermally conductive contact with a resistor.

12. The termination assembly of claim 11, wherein the saddle of the first saddle assembly is in contact with a surface of the first heat responsive adhesive element.

13. The termination assembly of claim 10, further comprising a second saddle assembly in thermally conductive contact with the second heat responsive adhesive element.

14. The termination assembly of claim 13, wherein the second saddle assembly includes a saddle that is in thermally conductive contact with a resistor.

15. The termination assembly of claim 14, wherein the saddle of the second saddle assembly is in contact with a surface of the second heat responsive adhesive element.

16. The termination assembly of claim 9, further comprising a first crimp tube engaged to a first crimp hole that extends through the first end and a second crimp tube engaged to a second crimp hole that extends through the second end, wherein the first and second crimp tubes define passageways.

17. The termination assembly of claim 9, further comprising index matching gel disposed between the ends of the first and second optical fibers.

18. A method for installing optical fibers in a termination assembly, the method comprising:
   inserting an end of a first optical fiber through a first end of a carrier;
   inserting an end of a second optical fiber through a second end of the carrier;
   inserting the ends of the first and second optical fibers into a V-groove of a V-groove chip;
   securing the first optical fiber to a first adhesive region of the carrier disposed between the V-groove chip and the first end; and
   securing the second optical fiber to a second adhesive region of the carrier disposed between the V-groove chip and the second end.

19. The method of claim 17, wherein index matching gel is disposed between the ends of the first and second optical fibers in the V-groove chip.

20. The method of claim 17, wherein the first optical fiber is secured to the first adhesive region by a first glue pellet and the second optical fiber is secured to the second adhesive region by a second glue pellet.

* * * * *